Patented Oct. 9, 1923.

1,470,300

UNITED STATES PATENT OFFICE.

EMERICH SZARVASY, OF BUDAPEST, HUNGARY.

PROCESS OF GRAPHITIZING PREFORMED CARBON BODIES.

No Drawing.   Application filed June 3, 1920.   Serial No. 386,407.

*To all whom it may concern:*

Be it known that I, EMERICH SZARVASY, a citizen of Hungary, residing at Budapest, Hungary, have invented certain new and useful Improvements in a Process for Graphitizing Preformed Carbon Bodies, of which the following is a specification.

My invention relates to a process by which a perfect graphitizing of carbon electrodes can be obtained in a simple and efficient way.

The baking or graphitizing of carbon bodies, such as electrodes and contacts is obtained by embedding the carbon bodies in coal- or coke-dust and subjecting them to the action of heat in gas-furnaces or still better in electric furnaces, for instance in accordance with the Acheson process, which process, owing to the improved graphitized state and increased conductivity of the carbon bodies produced, is to be preferred in the production of electrodes for electrolytic purposes.

According to my invention, the carbon electrodes are heated in an atmosphere of methane to the temperature where methane is decomposed. The carbon particles generated by the decomposition of the methane precipitate chiefly on the surface of the heated electrodes, forming an exceedingly dense coating, the thickness of which can be regulated by the time of the action of the methane from a fraction of a millimeter to several millimeters.

I am aware that gases yielding carbon have already been used in graphitizing processes, but the only gases used up till now were the higher hydrocarbons, which decompose at relatively low temperatures, yielding carbon and lower hydrocarbons besides products of minor value. In contradistinction thereto I use the gas with the lowest possible content of carbon, viz. methane, which at the same time is the hydro carbon most difficult to decompose; by using methane in the process of graphitizing, I obtain excellent, dense bodies with a clear, metallic sound.

My invention is based on the supposition that by graphitizing the carbon thus treated does not undergo a transformation, but its pores are filled up by the minute carbon particles generated by the thermic decomposition of the gases, which are developed under the influence of heat either from the carbon body or from the atmosphere surrounding it and that in order to accelerate and improve the graphitizing, an artificial supply of the gas which is the most stable at high temperatures will yield the best results. These suppositions are confirmed by the good results obtained with my process, which results may be further attributed to the possibility that the carbon originating from that hydrocarbon which presents the greatest stability at high temperature has many of the properties specific to graphitic carbon and which are found also in other kinds of carbon produced by pyrogenetic methods.

The electrodes graphitized according to the new process have an exceedingly resistive surface obviously adapted for electrolytical purposes.

If the methane is diluted with indifferent gases the decomposing temperature is lowered whereby it is rendered possible to graphitize at relatively low temperature. The new process further renders it possible to graphitize electrodes previously baked by any known process.

The heating of the electrodes may be carried out either externally, for instance by gas heating, or internally by electric resistance heating, for instance in a rotary kiln, in which the electrodes to be graphitized are embedded in coal grit, produced likewise by thermic decomposition of methane. The current flowing through the charge of the furnace produces the heat for decomposing the methane; the graphitic carbon is precipitated partly on the surface of the carbon bodies to be treated, and partly on the surface of the grit, thereby producing an increased quantity of carbon grit; as this grit is one of the best raw materials for the manufacture of electrodes, this embodiment of my invention enables me to produce raw material for electrodes and to graphitize the electrodes at the same time.

What I claim is:

1. The process for graphitizing electrodes formed as usual which consists in heating the electrodes in an atmosphere of methane to a temperature at which methane decomposes.

2. The process, which consists in heating carbon bodies in an atmosphere of methane diluted with indifferent gases, to the temperature at which methane decomposes.

3. The process, which consists in heating carbon bodies in an atmosphere of methane, said bodies being embedded in carbon grit originating from methane decomposed by electric resistance heating, to the temperature at which the methane decomposes.

In testimony whereof I affix my signature in presence of two witnesses.

EMERICH SZARVASY.

Witnesses:
J. CHAS. MEDQYLS,
EUG. HARSANYI.